A. ABRAMSON.
CULTIVATOR SHOVEL.
APPLICATION FILED MAY 10, 1916.
1,199,329.
Patented Sept. 26, 1916.
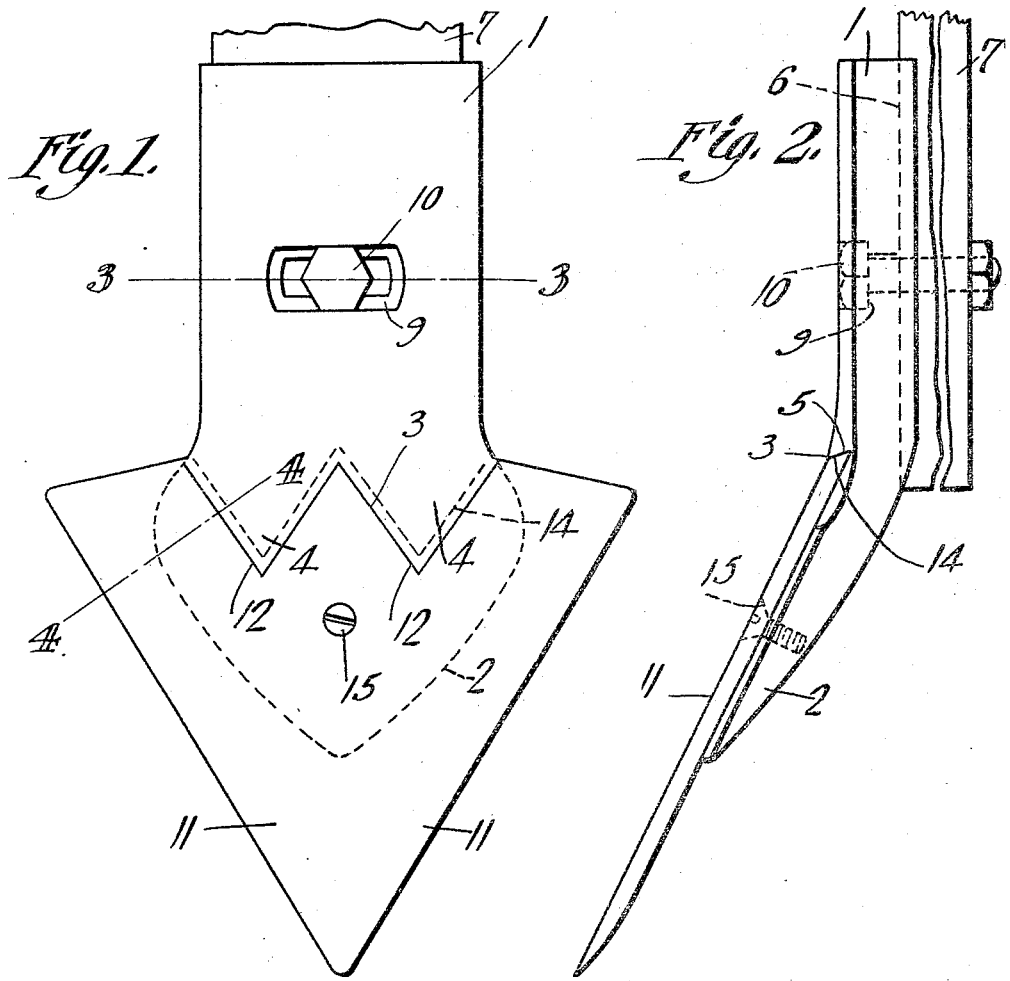
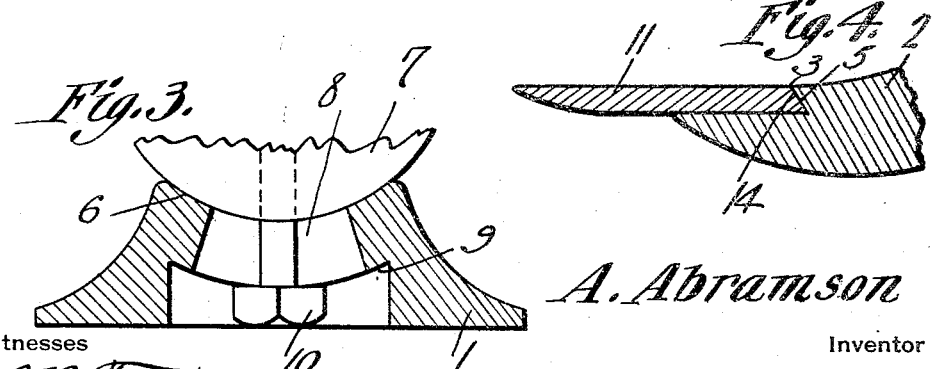
A. Abramson
Inventor

UNITED STATES PATENT OFFICE.

AUGUST ABRAMSON, OF DELVALLE, TEXAS.

CULTIVATOR-SHOVEL.

1,199,329.  Specification of Letters Patent.  Patented Sept. 26, 1916.

Application filed May 10, 1916. Serial No. 96,637.

*To all whom it may concern:*

Be it known that I, AUGUST ABRAMSON, a citizen of the United States, residing at Delvalle, in the county of Travis and State of Texas, have invented a new and useful Cultivator-Shovel, of which the following is a specification.

The device forming the subject matter of this application is a cultivator shovel, and one object of the invention is to provide a shovel of the type above described embodying a shank provided with a detachable blade, the blade being detachable in order that the same may be sharpened or repaired without removing the shank portion of the shovel from the cultivator.

Another object of the invention is to strengthen the connection between the blade and the shank, so that the blade cannot move with respect to the shank.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings:—Figure 1 shows in front elevation, a cultivator shovel embodying the present invention; Fig. 2 shows the cultivator shovel in side elevation; Fig. 3 is a cross section on the line 3—3 of Fig. 1; and Fig. 4 is a section on the line 4—4 of Fig. 1.

The cultivator shovel forming the subject matter of this application includes a shank 1 which is thinned and broadened adjacent its lower end to form a forwardly inclined foot 2. The forward face of the foot 2 is set back from the forward face of the shank 1 to define a scarf 3 which is of W-shape and embodies downwardly extended points 4. These points 4 are undercut as shown at 5. The shank 1 is grooved longitudinally on its rear face as shown at 6 to receive the standard 7 of the cultivator. In the shank 1 is formed a double diametered, laterally enlarged opening 8 including a shoulder 9. A securing device 10 which may be a bolt or screw, passes through the opening 8, and engages the standard 7, the head of the element 10 resting upon the shoulder 9. The construction is such, in view of the foregoing arrangement of parts, that the cultivator shovel may be adjusted circumferentially of the standard 7 and be held in adjusted positions.

The invention includes a pointed blade 11 resting on the foot 2. In its upper edge, the blade 11 is provided with a W-shaped notch 12 receiving the points 4 of the scarf 3. The walls of the notch 12 in the blade 11 are beveled as shown best at 14 in Fig. 4, to engage with the undercut edges 5 of the scarf 3. A securing device 15, which may be a bolt or screw, connects the blade 11 with the foot 2.

Owing to the fact that the shank 1 of the foot 2 are integrally formed, an unusually secure support for the blade 11 is provided. Since the scarf 3 and the notch 12 in the shank 1 and in the blade 11 respectively are of W-shape, an efficient lock between the blade and the shoulder is provided, adapted to prevent the blade from moving sidewise. Further, owing to the fact that the blade is beveled as shown at 14, to engage with the undercut part 5, of the scarf 3, the strain on the securing element 15 is greatly reduced when the blade 11 is pressed forwardly through the ground. It will be understood that, by detaching the securing element 15, the blade 11 may be disconnected from the shank 1 without removing the shank 1 from the standard 7 of the cultivator. As hereinbefore stated, a circumferential shifting of the shank 1 with respect to the standard 7 is possible, owing to the shape of the opening 8, and owing to the way in which the groove 6 in the rear face of the shank 1 receives the standard 7 of the cultivator, Fig. 3 being noted particularly for a clear understanding of this detail.

Having thus described the invention, what is claimed is:—

A cultivator shovel embodying a shank provided with a depending foot, the forward face of which is set back from the forward face of the shank to form a transverse scarf of W-shape defining two depending V-shaped points and a V-shaped notch between the points; a blade resting on the foot and provided in its upper edge with a W-shaped notch defining an upwardly extended V-shaped point received in the first specified notch, and defining V-shaped notches receiving the first specified points, the scarf being undercut, and the walls of the W-shaped notch in the blade being beveled to correspond with the undercut portion of the scarf; and a securing device connecting the blade with the foot.

In testimony that I claim the foregoing as my own, I have hereto affixed my signature in the presence of two witnesses.

AUGUST ABRAMSON.

Witnesses:
O. P. BAMER,
S. A. RACK.